United States Patent [19]

Vetere et al.

[11] 3,857,667

[45] Dec. 31, 1974

[54] PHOTOFLASH LAMP ARRAY HAVING SUPPORT STRUCTURE ON BASE

[75] Inventors: John J. Vetere, Danvers, Mass.; Donald E. Armstrong, Williamsport, Pa.

[73] Assignee: GTE Sylvania Incorporated, Danvers, Mass.

[22] Filed: Oct. 23, 1973

[21] Appl. No.: 408,464

[52] U.S. Cl. ................ 431/95, 240/1.3, 339/75 MP

[51] Int. Cl. ............................................ F21k 5/02

[58] Field of Search ................ 431/92, 95; 240/1.3; 339/75 MP, 91 R

[56] References Cited

UNITED STATES PATENTS

| | | | |
|---|---|---|---|
| 3,407,717 | 10/1968 | Ernisse | 339/91 R |
| 3,598,985 | 8/1971 | Harnden | 431/95 |
| 3,602,870 | 8/1971 | Willard | 339/75 MP |
| 3,614,412 | 10/1971 | Bellows | 240/1.3 |
| 3,638,166 | 1/1972 | Steipe | 339/61 M |
| 3,710,303 | 1/1973 | Gallager | 339/75 MP |
| 3,725,693 | 4/1973 | Anderson et al. | 240/1.3 |

*Primary Examiner*—Carroll B. Dority, Jr.
*Attorney, Agent, or Firm*—Edward J. Coleman

[57] ABSTRACT

A multilamp flash unit comprising a two-sided linear array of reflectors and photoflash lamps connected to a printed circuit board supported on a plastic base. The assembly is enclosed by a transparent cover, and the printed circuit board has a contact tab which projects through a slot in the base for insertion into an edge connector. Firm location of the printed circuit board and tab position is provided by a support structure comprising a pair of flexible, bifurcated posts which project upwardly from the base on both sides of the slot therein and each of which resiliently engage opposite sides of the printed circuit board by means of flatted protruding portions on the sides of a slot in each post.

11 Claims, 5 Drawing Figures

PHOTOFLASH LAMP ARRAY HAVING SUPPORT STRUCTURE ON BASE

BACKGROUND OF THE INVENTION

This invention relates to multilamp photoflash units and, more particularly, to an array of electrically ignitable flashlamps functionally mounted on a printed circuit board and the base support structure related thereto.

Constructions for multilamp photographic flash units including a linar array of flashlamps connected to a printed circuit board having a depending contact tab for insertion into a camera edge connector are well known in the art as disclosed, for example, in U.S. Pat. Nos. 3,598,985 and 3,725,693. The printed circuit board-lamp assembly is supported on a trough-shaped base, with the contact tab extending through a slot in the base, and is enclosed, along with reflectors for the lamps, by a transparent cover. According to the first-mentioned patent, the base has a longitudinally extending slot within which the printed circuit board is seated to provide location and upright support, the contact tab passing through a central opening in this slot. In the second-mentioned patent, the base includes a central opening for the contact tab; however, circuit board location and support is provided by a pair of posts located at opposite ends of the base and each have a slot within which a respective end of the board is inserted.

In practical implementation, the nominal width of the longitudinal base slot or the post slots must be slightly greater than the nominal width of the printed circuit board in order to provide the necessary clearance for accommodating normal variation in part tolerances. As a result of this clearance, a number of the circuit board-lamp assemblies may fit loosely into the base member, such that the contact tab may be tilted within the base and not adhere to "true dimension" with respect to the base-cover assembly. If the printed circuit board is tilted during the array sealing operation, it will generally maintain this faulty positioning, due to array parts, such as the reflector, sealing into the top of the printed circuit board. A contact tab that is out of true dimension with respect to the cover-base assembly may not properly fit the cameras for which it was designed. It may cause interference with the camera viewfinder and, at times, render the viewfinder inoperable.

SUMMARY OF THE INVENTION

Accordingly, it is an object of the present invention to provide an improved multiple photoflash lamp array.

A particular object is to economically provide an electrically ignitable multilamp flash unit containing a printed circuit board interconnect member and improved means for supporting the circuit board and maintaining the dimensional stability of the unit.

These and other objects, advantages and features are attained, in accordance with the principles of this invention, by providing a pair of flexible, bifurcated posts on the upper surface of the flash unit base which resiliently engage opposite sides of the printed circuit board supported thereon by means projecting from both sides of a slot in each post. For example, the base and posts may be formed of a plastic material, and the projecting means may comprise opposed protruding portions defined on the side walls of the post slot, each protruding portion having a flat surface which bears against a side of the supported printed circuit board and an inclined surface toward the outer end of the slot to facilitate insertion of the circuit board. The post slots are dimensioned so that prior to assembly, the clearance between the opposed protruding portions in each slot is narrower than the thickness of the printed circuit board, while the remainder of the slot is wider than the circuit board thickness. By forming support posts in this manner, a support structure is readily and economically provided which guides board insertion and is flexible enough to accommodate varying part tolerances, yet provides a pincer action for fixedly locating the circuit board on the base and maintaining the position of the contact tab, which extends from the circuit board through a slot in the base, in a predetermined dimensional relationship with respect to the base.

BRIEF DESCRIPTION OF THE DRAWINGS

This invention will be more fully described hereinafter in conjunction with the accompanying drawings, in which.

DESCRIPTION OF PREFERRED EMBODIMENT

Figures 1, 2, 3, 4, 5:
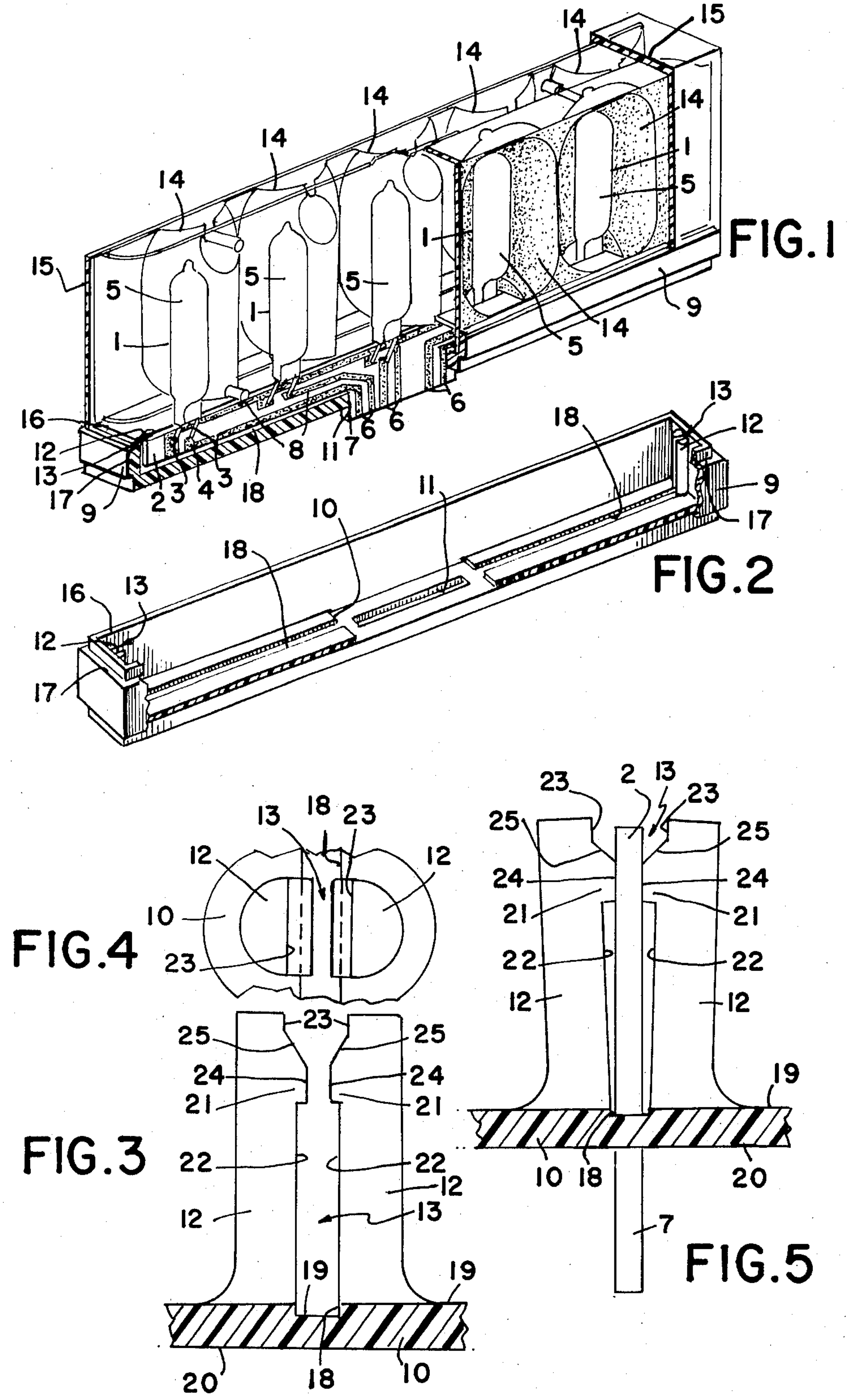
FIG. 1 is a perspective view on an enlarged scale of a photoflash unit having a linear array of electrically ignitable flash lamps connected to a printed circuit board and having a base support structure according to the invention, the view being shown partly broken away in section to more clearly illustrate the construction thereof.
FIG. 2 is a perspective view, partly broken away, of the base member employed in flash unit of FIG. 1.
FIG. 3 is a greatly enlarged detail elevation of one of the support posts projecting from the base of FIG. 2, as viewed from one end of the base interior.
FIG. 4 is a top view of the support post shown in FIG. 3.
FIG. 5 shows the support post of FIG. 3 with a circuit board seated therein, as viewed from one end of the base interior

In the specific embodiment illustrated in FIG. 1, the photoflash unit comprises an array of 10 lamps 1 arranged in two parallel staggered rows of five lamps each mounted respectively on each side of a printed circuit board 2. Each lamp has a pair of lead-in wires 3 secured, e.g. by soldering or welding, in electrical connection with an adjacent pair of lamp contact areas or pads 4 on the circuit board 2. The photoflash lamps 1 are tubular and baseless and, as well known in the art, comprise an hermetically sealed tubular glass envelope containing an ignition filament and filled with a filamentary combustible material, such as shredded foil of zirconium or hafnium, which ignites and produces a flash of high intensity light when an electric current is supplied to the ignition filament through the wire leads 3.

As described in the previously referenced patents, the printed circuit board 2 may comprise a thin metallic sheet substrate such as steel having on both its flat surfaces a coating of an insulating material, such as a procelain enamel or glass or some other vitreous material, on which is deposited, on each side of the board 2, a printed circuit conductive pattern made of, for example, silver and glass paste. The conductive pattern on each side of the board 2 includes a plurality of terminal contact areas 6 located on a depending tab portion 7 on the board 2 centrally located along the longitudinal edge thereof opposite the edge of the board from which the lamps 1 upstand. The terminal contacts 6 are in the form of elongated strips that extend parallel to one another and perpendicularly to the edge of the tab 7, and they are selectively interconnected by suitably shaped conductive traces 8 with a plurality of lamp contact areas or pads 4, which are generally aligned adjacent the opposing edge of the board 2, there being two contact pads for each of the lamps 1. It will be noted that for a row of five lamps 1 there are six of the terminal contacts 6, one for each of the lamps and one that is common to all of the lamps. Accordingly, tab portion 7 is adapted for insertion into an edge connector assembly for operative interconnection with a selective energizing circuit.

The printed circuit board 2 is mounted in an upright position within an elongated base 9. FIG. 2 illustrates the base member alone which, for example, may comprise a single piece molded from a suitable plastic material, such as polystyrene. The base member 9 may be of trough-shaped form, with the printed circuit board 2 received within the hollow interior of the base and resting on the bottom wall 10 thereof, and with the contact tab portion 7 of the circuit board extending down through a centrally located longitudinal through-slot 11 in the bottom wall 10 of the base so as to project from the underside thereof to expose the lamp terminal contacts 6 thereat. As will be described in greater detail hereinafter, the printed circuit board 2 is firmly and accurately supported in an upright position within base 9 by a pair of flexible, bifurcated support posts 12 projecting upwardly from the bottom wall 10 of the base member and located on opposite sides of the through-slot 11. Each post 12 has a longitudinally extending slot 13 aligned with the through-slot 11, and the opposite ends of the rigid circuit board 2 are fitted in to these slots 13. The upper surface of bottom wall 10 is also provided with slot-shaped recess portions 18 which are longitudinally aligned with and located on opposite sides of the through-slot 11 for providing additional support means within which the printed circuit board is seated.

In addition to the lamps 1 mounted on the base 9, the unit also comprises a plurality of reflectors 14 respectively disposed about the flashlamps and arranged to provide a pair of back-to-back, oppositely facing linear arrays of lamp reflectors, and a rectangular box-shaped light-transmitting cover 15 of a suitable transparent plastic, such as polystyrene, for enclosing the assembly of flashlamps, reflectors and printed circuit board. More specifically, the reflectors 14 are provided in the form of a pair of strips or moldings which are inserted down between the two rows of lamps and rest on the top rim 16 of the base 9. The cover 15 is positioned down over the assembled lamps 1 and reflectors 14 and encases the four sides of the base 9 around the shouldered upper rim portion 17 thereof. The cover 15 may be ultrasonically welded or otherwise suitably fastened to base 9 to provide a unitary construction for the array that can be plugged onto a camera or flash accessory as a unit and then removed and thrown away when all of the lamps have been flashed.

In accordance with the invention, each of the support posts 12 is provided toward its outer end with means projectingfrom both sides of the slot 13 which resiliently engage opposite sides of the circuit board seated therein for firmly locating the board 2 and maintaining the position of tab 7. More specifically, referring to FIGS. 3 and 4, which respectively show elevation and top views of a single support post with the circuit board removed and as viewed from one end of the base interior. The bottom wall 10 of base 9 is defined by a first or upper surface 19 and a second surface 20 spaced therefrom. Each bifurcated post 12 projects from the first or upper surface 19 and is disposed normal to it; hence, the slot 13 in each post is also disposed normal to the upper base surface. Typically, post 12 is an integral part of a molded base piece 9, and the aforementioned "projecting means" comprises a protruding portion 21 defined on each of the plastic side walls of the slot. As shown in FIGS. 3 and 4, the pair of protruding portions in each slot are disposed opposite one another toward the outer end of the slot. The vertical slot side walls 22 below the protruding portions 21 are substantially parallel prior to assembly and extend to the upper surface 19 of the bottom wall of the base. More specifically, each post slot 13 extends into the respective slot-shaped recess portion 18, both of which aree aligned with the through-slot 11. The nominal width between the lower sidewalls 22 is greater than the nominal thickness of the printed circuit board to allow for normal variations in the dimensional tolerances of interfitting parts.

The vertical slot sidewalls 23 above the protruding portions 21 are substantially parallel with, but spaced wider apart than the walls 22 to facilitate location of the circuit board into the slot 13 during assembly. Each protruding protion 21 is formed to have a flat surface 24 parallel to the slot side wall 22 and an inclined surface 25 toward the outer end of the slot. The nominal unflexed clearance provided between the flat surfaces 24 of the opposed protruding portions in each slot (prior to assembly with the circuit board) is narrower than the thickness of the printed circuit board 2. Hence, the inclined surfaces 25 slope inwardly from the widely spaced slot walls 23 and lead into and meet the narrowly spaced flat surfaces 24 to facilitate insertion of the printed circuit board into the slot 13. As shown in FIG. 5, once the printed circuit board 2 is fully seated into slot 13, with its bottom edge resting on base surface 19 and along the slot-shaped recess 18, the flat surfaces 24 of the opposed protruding portions 21 bear against opposite sides of the printed circuit board. Each post portion defining a side of the slot 13 is flexible, e.g., the posts 12 may be projecting portions of a base 9 molded from a plastic material such as polystyrene. Hence, insertion of the board 2 into the narrower protruding portions 21 causes the post halves to spread somewhat, whereby the opposed flat surfaces 24 resiliently engage the sides of the circuit board like a set of pincers for fixedly locating the circuit board on the base while accommodating varying part tolerances. Of particular importance, however, the flexible bifurcated posts 12 maintain a uniform side pressure in supporting the circuit board which keeps it firm and straight through all subsequent assembly processes and, thus, maintains the position of the contact tab 7 in a predetermined dimensional relationship with respect to base 9 and its bottom wall 10. In short, the flexible posts 12 guide and center the circuit board tab 7 into through-slot 11 and thereafter prevent the projecting tab from tilting or otherwise shifting from its designed position, thereby precluding faulty mounting of the flash unit on a camera or photoflash apparatus.

Although the invention has been described with respect to a specific embodiment, it will be appreciated that modifications and changes may be made by those skilled in the art without departing from the true spirit and scope of the invention.

What we claim is:

1. Support structure in a multilamp flash unit; said unit including a printed circuit board having a depending contact tab for insertion into an edge connector assembly, a plurality of flashlamps connected to said printed circuit board, and a base having an upper surface supporting said printed circuit board and a through-slot therein through which said contact tab extends and projects from the other side thereof; said support structure comprising:

a pair of flexible bifurcated posts projecting from the upper surface of said base and located on opposite sides of said through-slot, each of said posts having a longitudinally extending slot aligned with said through-slot and within which said printed circuit board is received and seated, and each post having means toward the outer end thereof projecting from both sides of the slot therein which resiliently engage opposite sides of the printed circuit board seated in said slot, each projecting means having a flat surface bearing against a side of the printed circuit board, whereby said printed circuit board is fixedly located on said base and the position of said contact tab projecting through said through-slot is maintained in a predetermined dimensional relationsnip with respect to said base.

2. The support structure of claim 1 wherein said base and posts are formed from a plastic material, the slot in each post extends at least to the upper surface of said base, said projecting means comprises a protruding portion defined on each of the two plastic side walls of said post slot, the pair of protruding portions in each slot being disposed opposite one another toward the outer end of said slot, and the unflexed clearance between the protruding portions in each post slot, prior to assembly with said printed circuit board, is narrower than the thickness of said printed circuit board, while the remainder of said slot is wider than the thickness of said printed circuit board.

3. The support structure of claim 2 wherein each of said protruding portions has a flat surface parallel to the slot side wall from which it projects and bearing against a side of the printed circuit board seated in said slot, and each protruding portion has an inclined surface toward the outer end of the slot in which it is located to facilitate insertion of said printed circuit board into the slot during assembly of said unit.

4. A base for a multilamp flash unit, said unit including a printed circuit board having a depending contact tab for insertion into an edge connector assembly, and a plurality of flashlamps connected to said printed circuit board; said base comprising:

means defining first and second spaced surfaces;

means defining a through-slot in said base for receiving the depending contact tab of said printed circuit board whereby said tab may extend through and project from the other side of said base;

a pair of flexible bifurcated posts projecting from the first surface of said base and disposed normal thereto, said posts being located on opposite sides of said through-slot, and each post having a slot disposed normal to said first surface and aligned with said through-slot for receiving said printed circuit board to provide support therefor;

and means defining oppositely disposed protruding portions in each post slot toward the outer end thereof, the extremity of each of said protruding portions having a flat surface parallel to the post slot.

5. The base of claim 4 wherein said base is formed from a plastic material, the slot in each post extends at least to the first surface of said base, and the clearance between the protruding portions in each post slot is narrower than the thickness of said printed circuit board, while the remainder of said slot is wider than the thickness of said printed circuit board.

6. The base of claim 5 wherein each protruding portion has an inclined surface toward the outer end of the slot which leads into and meets said flat surface.

7. The base of claim 6 further including means defining slot-shaped recess portions in said first surface which are longitudinally aligned with and located on opposite sides of said through-slot and within which said printed circuit board is seated, and wherein said post slots extend into said recess portions.

8. A multilamp flash unit comprising, in combination:

a trough-shaped base member having a bottom wall defined by upper and lower spaced surfaces and a centrally located longitudinal through-slot in said bottom wall;

a printed circuit board supported on the upper surface of said base member and having a depending contact tab extending through said through-slot and projecting from the lower surface of said base bottom wall for insertion into an edge connector assembly;

a plurality of flashlamps connected to said printed circuit board;

a plurality of reflectors respectfully disposed about said flashlamps and arranged to provide a linear array of lamp-reflectors;

a transparent cover supported on said trough-shaped base and enclosing said flashlamps, reflectors, and printed circuit board;

a pair of flexible bifurcated posts projecting upwardly from the upper surface of said base and located on opposite sides of said through-slot, each of said posts having a slot disposed normal to said first surface, aligned with said through-slot, and within which said printed circuit board is seated; and means projecting from both sides of each of said post slots which resiliently engage opposite sides of the printed circuit seated in said slot, each projecting means having a flat surface bearing against a side of the printed circuit board, whereby said printed circuit board is fixedly located on said base, and the position of said contact tab projecting through said through-slot is maintained in a predetermined dimensional relationship with respect to said base and cover assembly.

9. The unit of claim 8 wherein said base and posts are formed of a plastic material, the slot in each post extends at least to the upper surface of said base, said projecting means comprises a protruding portion defined on each of the two plastic side walls of said post slot with said flat surface being at the extremity of each protruding portion, the pair of protruding portions in each slot being disposed opposite one another toward the upper end of said slot, and the unflexed clearance between the protruding portions in each post slot, prior to assembly with said printed circuit board, is narrower than the thickness of said printed circuit board, while the remainder to said slot is wider than the thickness of said printed circuit board.

10. The unit of claim 9 wherein said flat surface of each of said protruding portions is parallel to the slot side wall from which it projects and bearing against a side of the printed circuit board seated in said slot, and each protruding portion has an inclined surface toward the end of the slot which leads into and meets said flat surface, said inclined surface facilitating insertion of said printed circuit board into the slot during assembly of said unit.

11. The unit of claim 10 wherein the upper surface of said base has slot-shaped recess portions which are longitudinally aligned with and located on opposite sides of said through-slot and within which said printed circuit board is seated, and said post slots extend into said recess portions.

* * * * *